United States Patent

[11] 3,622,425

[72] Inventor Michael Savarick
 218 Somerset Drive, Hewlett, N.Y. 11557
[21] Appl. No. 859,138
[22] Filed Sept. 18, 1969
[45] Patented Nov. 23, 1971

[54] FILM STRIP HANDLING AND SPLICING APPARATUS
 4 Claims, 7 Drawing Figs.

[52] U.S. Cl. .................................................. 156/505,
 156/502, 352/130
[51] Int. Cl. .................................................. B31f 5/06,
 B65h 19/18
[50] Field of Search .................................. 156/502,
 505, 506, 507; 352/130

[56] References Cited
UNITED STATES PATENTS
3,130,100 4/1964 Hasselquist.................. 156/507 X
3,379,597 4/1968 Di Francesco................ 156/506

*Primary Examiner*—Benjamin A. Borchelt
*Assistant Examiner*—J. J. Devitt
*Attorney*—Myron Amer ABSTRACT: An apparatus for splicing smaller film strips end-to-end so as to produce a single, elongated strip which is more convenient and advantageous for continuous, economical film development. With minimal hand operations, successive film strips are trimmed, advanced to a splicing station, and joined to each other along abutting adjacent ends. The foregoing mode of operation is achieved without contact which would adversely effect the undeveloped film and, because of nominal hand operations, is able to be practiced in a darkened environment which does not expose the film.

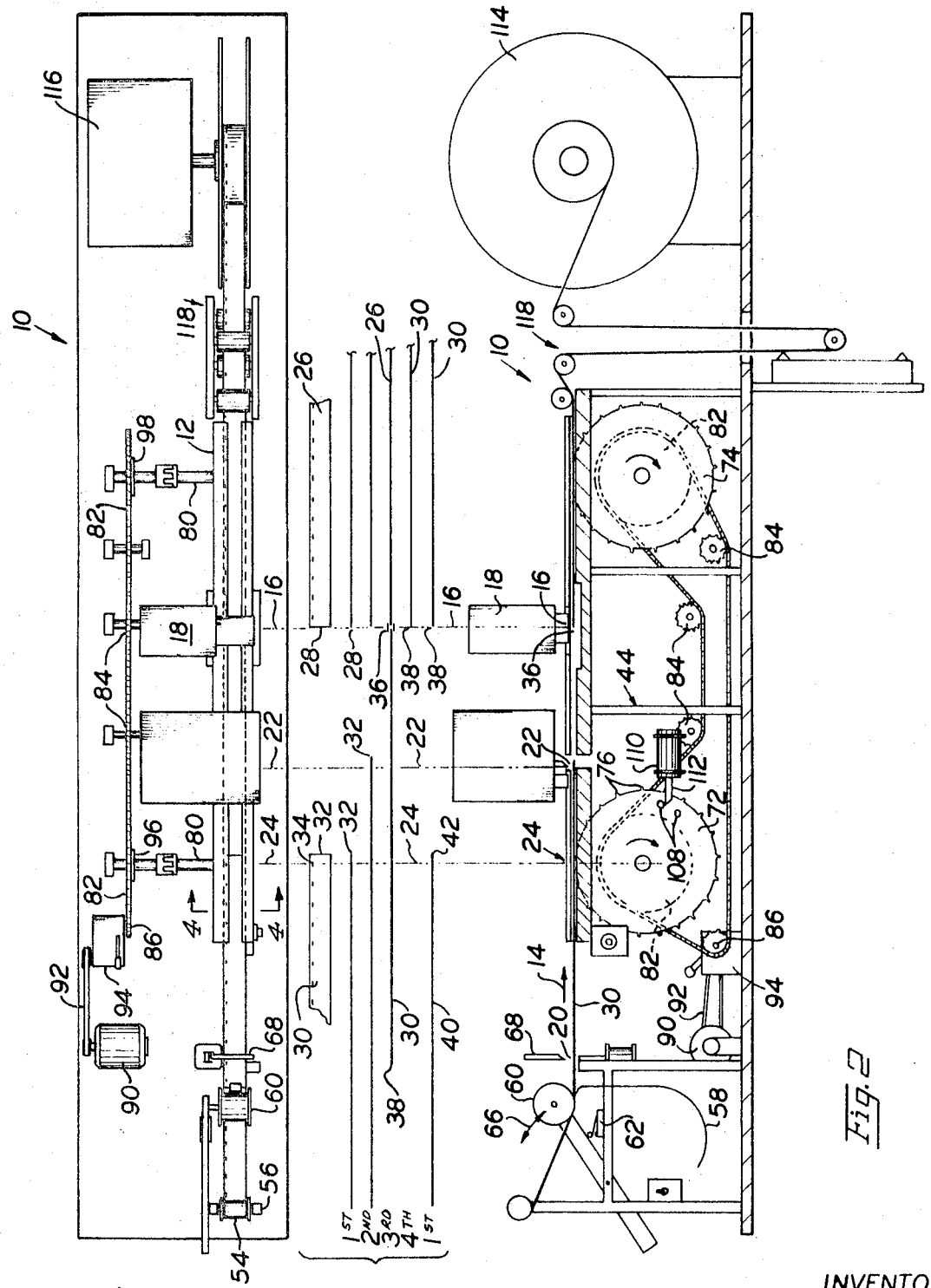

PATENTED NOV 23 1971

INVENTOR
MICHAEL SAVARICK

BY
*Myron Amer*
ATTORNEY

FILM STRIP HANDLING AND SPLICING APPARATUS

The present invention relates generally to film strip handling preparatory to and during the splicing thereof, and more particularly to improvements in apparatus for splicing film strips to each other in the production of a single, elongated strip.

In the developing of film on a commercial and thus large-scale basis, it has been found desirable to splice the undeveloped film strips end to end to each other and thereby create a single, elongated strip which is more conveniently handled during developing of the film. Specifically, the spliced film strips are put up on a supply spool or reel and are then fed along a system of rollers through film-developing chemicals which, of course, results in the development of the film. Afterwards, the single strip is separated into the original smaller strips and further processed.

There is thus a need for an apparatus for producing the foregoing convenient-to-handle elongated film strip. The available prior art splicing apparatus cannot produce successively joined film strips. Among other reasons, these apparatus require that the film strips or lengths to be spliced together be moved from separated clearance positions into an adjacent splicing position and, after splicing, be cleared from the apparatus. Thus, two, or at best a small number of film strips, can only be joined using prior art splicing apparatus, whereas it is necessary for successive film strips to be handled on a continuous basis in order to economically produce the referred to single film strip.

Broadly, it is an object of the present invention to provide an improved film strip splicing apparatus overcoming the foregoing and other shortcomings of the prior art. Specifically, it is an object to provide apparatus having an automated mode of operation during which successive film strips are spliced into a single, convenient-to-handle large length. Moreover, the construction and mode of operation of the apparatus hereof is consistent with minimal hand operations so that the apparatus can readily be used in a darkened environment, as is required to prevent film exposure, where such hand operations cannot readily be performed. Further, film handling is achieved without adverse effect on the emulsion and delicate portions of the undeveloped film strips.

An apparatus for producing spliced film strips demonstrating objects and advantages of the present invention includes means defining a feed path leading to and beyond a splicing station, and separately operable means for urging film strips through feed movement in accordance with prescribed movement sequences. Specifically, a leading end of a first film strip is moved adjacent a trailing end of a second film strip already in position at the splicing station and, after splicing of these adjacent film ends together, both strips are moved along the feed path until the trailing end of the first strip is in splicing position at the splicing station whereupon the cycle is repeated. As will be explained subsequently, the trimming of each film strip to a precise length prior advancement to the splicing station facilitates the automated handling and positioning thereof and, in other respects as well, the made of operation provides the desired successive splicing of film strips with a minimum possibility of malfunctioning.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a plan view of a film strip handling and splicing apparatus according to the present invention;

FIG. 2 is a side elevational view of the apparatus showing further structural features thereof;

FIG. 3 is a flow chart of the movement of film strips during the operation of the apparatus and is best understood from a comparison with FIGS. 1 and 2, and for this reason, has been placed between these figures;

Figure 4:
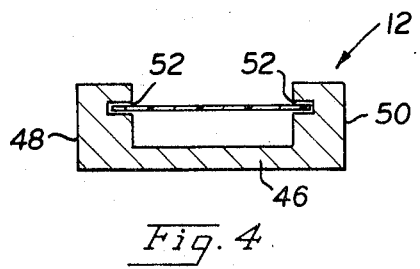
FIG. 4 is a partial front elevational view, on an enlarged scale and in section taken along line 4—4 of FIG. 1, showing further structural details of the feed path of the film strip.

Reference is now made to the drawings, and in particular to FIGS. 1-3 wherein there is shown a film strip handling and splicing apparatus, generally designed 10, demonstrating objects and advantages of the present invention. In the developing of film on a commercial and thus large-scale basis, it has been found desirable to splice the undeveloped film strips end to end to each other into an elongated single film strip. These spliced film strips, for convenience in handling, are then put up on a supply spool and are then appropriately supported and fed along a system of rollers through film developing chemicals which, of course, result in the development of the film. The individually developed film strips are then detached from each other and are returned to their owners. Apparatus 10, as will be described in detail subsequently herein, is effective in achieving the splicing of successive film strips to each other and thus is a significant advance in the art of film development techniques and procedures.

Apparatus 10 includes a generally U-shaped elongated guide member 12 which defines a feed path for the film strips. Successive film strips are fed in the feed direction 14, or, in other words, from left to right as viewed in FIG. 2, along the guide 12. It is during this feed movement 14 that the leading and trailing ends of a film strip are trimmed, and the trimmed film strip brought into adjacent position with a preceding trimmed film strip. The two film strips are spliced together, and then both are cleared from the feed path or guide 12 to the point where the trailing end thereof is in splicing position preparatory to the next splicing operation. As just described, this efficient mode of operation of the apparatus 10 enables it not only to achieve splicing of film strips end to end to each other but also enables this result to be achieved with minimum intervention of any workers and thus in a darkened environment which, of course, is necessary in order not to prematurely expose the film. Additionally, the movement of the film, as will be apparent subsequently, is achieved in a way which does not adversely effect the emulsion on the body of the film. Thus, there is no interference with conditions for proper development of the film.

Continuing now with a description of the apparatus 10, it will be understood that located along the feed path 12, approximately at a medial location therealong, is a splicing station, as at 16, at which there is located a conventional splicing mechanism 18. Splicing mechanism 18 may be any one of several commercially available models, such as, for example, the "Unicorn" film splicer sold by the Hollywood Film Company of Hollywood, California. This mechanism is effective in applying a strip of adhesive tape across the abutting ends of adjacent film strips. Since the operation of the mechanism 18 is well known, for brevity's sake, the description of its mode of operation will be omitted except as it relates to and is necessary for an understanding of the present invention.

In addition to the splicing station 16, there are also two spaced-apart cutting stations, as at 20 and 22, which are located along the feed path, and more particularly along the front portion thereof. These cutting stations, as will be explained in greater detail subsequently, are effective in trimming the leading and trailing ends of a film strip preparatory to the delivery of the film strip to the splicing station 16. A further station or position which should be noted as existing along the feed path 12 is starting position 24 for each film strip fed into the apparatus 10 for handling and splicing.

With the above general understanding of the apparatus 10, it is believed that the subsequent detailed description of the construction and mode of operation thereof can perhaps best be understood if the mode of operation is first described with reference to the flow diagram of FIG. 3. Specifically, as intended to be illustrated in FIG. 3, the assumed starting condition for splicing operation is when a typical film strip 26 has been urged through feed movement along feed path 12 to the extent where the trailing end 28 thereof is in splicing position at splicing station 16. At this time, the next succeeding film strip 30 is manually introduced into the apparatus 10. That is, the leading end 32 of this strip is manually placed in the guide member 12 and move therealong until a first encountered notch 34 located along a marginal edge of the strip 30 is engaged and locates the strip end 32 at the starting position 24. It will soon be described how this is accurately determined. Next, the first prescribed movement sequence of the film strips occurs. This consists of the advancement of the film strip 30 such that the leading end 32 is moved from the starting position 24 to the cutting station 22 at which it is trimmed by a cutting stroke of knife 36. Also, in a preferred embodiment, strip end 32 is perforated with an identification number which facilitates later processing of the strip 30. The next movement sequence consists of further advancement of the strip 30 in the feed direction 14 such that the film strip leading end 32 is positioned adjacent the trailing end 28 of the film strip 26. Once the film strip ends 32 and 28 abut each other, splicing mechanism 18 is operated so as to deposit an adhesive strip 36 across these film ends so as to achieve splicing together of the film strips 26 and 30. The next movement sequence consists of clearing of the spliced together film strips 26 and 30 from the guide 12. This is done to the extent where the trailing end 38 of the film strip 30 is advanced to the position previously occupied by the trailing end 28 of the preceding film strip 26. The cycle is then repeated when the third film strip 40 is manually introduced into the apparatus 10 and the leading end 42 thereof advanced to the starting position 24.

Returning again to the description of the construction of apparatus 10, it will be noted that it includes an appropriate support frame 44 for maintaining the guide 12 in an elevated, substantially horizontal orientation. Guide 12, as best shown in FIG. 4, is substantially U-shaped in cross section and includes a bottom wall 46 and opposite sidewalls 48 and 50 which are each provided with facing notches 52 for accommodating the marginal edges of a film strip while the body of the strip is maintained in a clearance position above the bottom wall 46. In this way, nothing is brought into contact with the emulsion along the body of the film strip.

Figure 7:
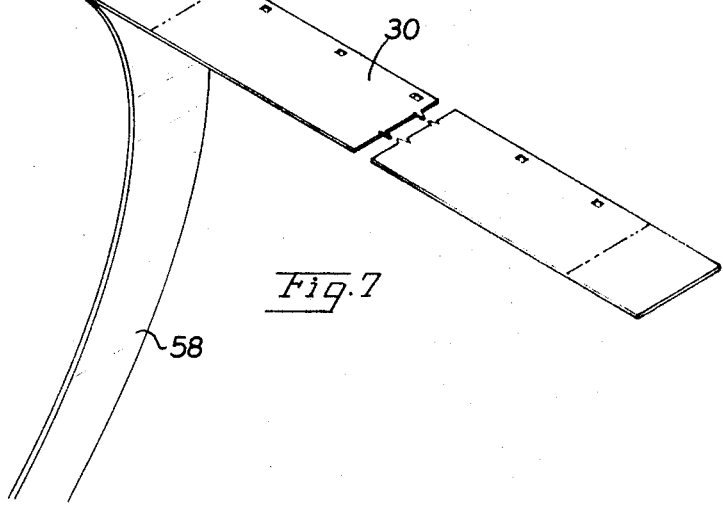
FIG. 7 illustrates the manner in which a typical film strip is removed from a supply spool thereof preparatory to being fed into the apparatus hereof.

Specifically, a typical film strip, which as shown in FIG. 7 is contained on a supply spool 54, is prepared for introduction into the apparatus 10 by having the supply spool 54 journaled for rotation between the bifurcated arms of a holding bracket 56. Actual threading of the film strip consists of separation of the film strip proper, designated 30 in FIG. 7, from the usual leader strip 58 and the placement thereof into the guide notches 52 to an extent which projects the film leading edge 32 just beyond the starting position 24. During this positioning of the film strip 30 it is threaded beneath, and only in edge contact with a pivotally mounted roller 60 which has a normal position closing a switch 62. Film strip 30 can be typically either a 12-frame strip or a 20-frame strip which, in turn, would determine its length. Naturally, if it is a 12-frame strip it is shorter than it would be if it contains 20 frames. The length of the film strip 30 is sensed by the roller 60 in that when the end of the strip, or more particularly the waste length portion 64 thereof (see FIG. 7) is reached, the film strip 30 is pulled taut between its attachment to the supply spool 54 and its engagement with the means of apparatus 10 which is effective in urging it through feed movement 14 along the guide 12. When strip 30 becomes taut in the manner just described, it is effective in raising and thus urging the roller 30 through pivotal movement 66 which has the effect of releasing switch 62 for operation. Operation of switch 62, in turn, will be understood to result in operation of a cutter 68 at cutting station 20 such that film strip 30 is severed at an appropriate location, as at 70 in FIG. 7, from the length portion thereof attached to the supply spool 54.

At this convenient point in the description, it should be understood that the severing of the trailing end 38 of the film strip 30 will occur prior to the advancement of the film strip to the cutting station 22 if the film strip is of a short 12-frame length or, on the other hand, it will occur just prior to the advancement of this film strip into the splicing station 16 if it is of a comparatively long 20-frame film strip. That is, related to the illustration of FIG. 3, the trimming of a 12-frame strip 30 will occur between the first and second movements, whereas the trimming of the trailing end 38 of a longer 20-frame film strip will occur between the second and third movements.

Figure 6:
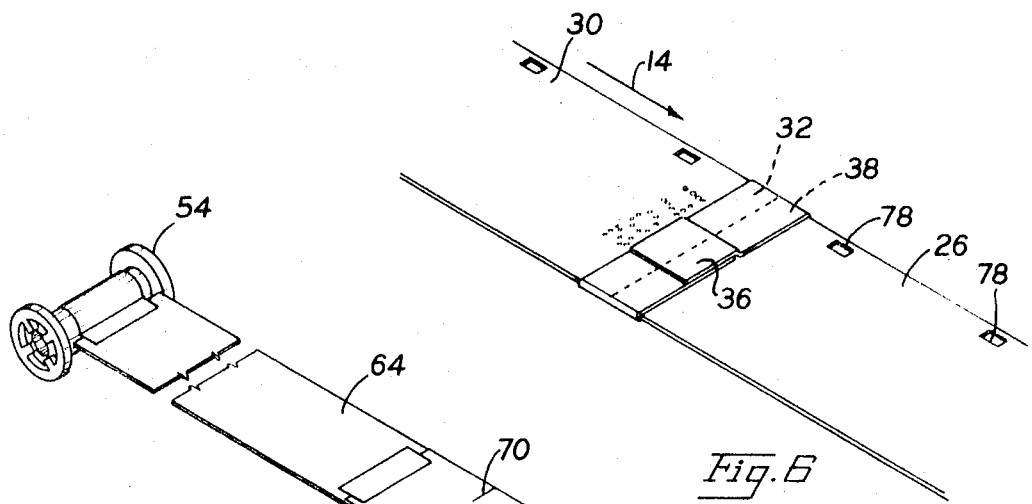
FIG. 6 is a perspective view illustrating the splice which joins together successive film strips.

The preferred means of urging the film strips through feed movement 14 consists of first and second sprockets 72 and 74, each having peripheral cogs, individually and collectively designated 76, circumferentially spaced thereabout the same distance as the distance between typical notches, designated 78 in FIG. 6, which are provided along a marginal edge of each of the film strips. Sprockets 72 and 74 are appropriately mounted for rotation on supporting shafts 80 which each terminate in sprockets 82. Trained about the sprockets 82, as well as about idler sprockets 84 and a driving sprocket 86, is an endless loop of chain 88. Motor 90 operating via a pulley belt 92 and speed control gear box 94 is effective in powering the driving sprocket 86 in rotation. During a typical interval of operation, the chain drive 88 is continuously powering the support shafts 80 in rotation, but this is not transmitted and thus effective in correspondingly driving either of the sprockets 72 or 74 in rotation until operation of magnetic clutches 96 and 98 having an interposed position between these support shafts 80 and the sprocket 72 and 74. Thus, the power for driving either of the sprockets 72 and 74 is always available and is effectively used whenever either or both of the magnetic clutches 96 and 98 are operated.

Figure 5:
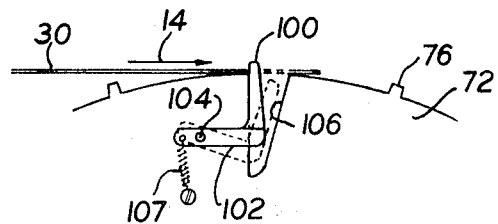
FIG. 5 is similarly a partial elevational view, on an enlarged scale, of a portion of a sprocket utilized for urging the film strips through feed movements.

To achieve the positioning of the leading end 32 of film strip 30 at starting station 24, this end of the film strip is projected within the forward end of the guide 12 until the first encountered film notch 34 engages with a retractable cog 100 of the sprocket 72. The foregoing is more particularly illustrated in FIG. 5 wherein it is shown that unlike the stationary, previously referred to cogs 76, sprocket 72 has a retractable cog 100 formed by an L-shaped member 102 movable about pivot 104 against a bias spring 106. That is, during clockwise rotation of sprocket 72 which results in feed movement 14, cog 100 is effective to urge the film strip to which it is engaged through feed movement 14. But, when sprocket 72 is stationary, it is possible to slide a film strip in the direction 14 along the periphery of this sprocket causing the body 102 to partake of pivotal retracting movement within a notch 106 of the sprocket. When notch 34 of the film strip, however, passes over the cog 100, this cog is projected by the bias spring 106 through the notch and thus into engagement with the film strip. Thus, the starting position of the sprocket 72 is the position in which the retractable cog 100 thereof is the one projected into the guide notch 52 so as to engage the film notch 34. This, of course, also establishes the starting position 24 of the film strip.

Once engagement is established between the sprocket 72 and film strip 30, as at film notch 34, operation of the clutch 96 will be understood to result in clockwise rotation (as viewed in FIG. 2) of sprocket 72 and thus feed movement 14 of the film strip 30. As a preferred technique of permitting advancement by the sprocket 72 of the film strip 30 from position to position, say, for example, from starting position 24 to cutting station 22, use is made of strategically located stops, individually and collectively designated 108, on the rear surfaces of the sprocket 72. Cooperating with the stops 108 is a device 110 which consists, more particularly, of a solenoid having a movement-blocking plunger 112 normally extended into the path of movement of the stop 108. That is, when plunger 112 is fully extended it is engaged by a stop 108 and thus prevents continued rotation of the sprocket 72. At this time, slippage occurs in the clutch 96. When, however, solenoid 110 is operated and plunger 112 is temporarily withdrawn and afterwards is then permitted to return to its blocking position, sprocket 72 is free to rotate at least until abutment with a next encountered stop 108. In this manner, by properly spacing the stops 108 circumferentially about the sprocket 72 it is possible to achieve the step-by-step advancement of a film strip in the manner already indicated in the description of the already noted FIG. 3 movement sequences.

Once the film strip 30 is advanced so that the leading edge 32 thereof is adjacent to the trailing edge 38 of the previously processed film strip 26, both the sprockets 72 and 74 are disconnected from their respective drives and the splicing mechanism 18 is operated. As shown in FIG. 6, this results in the deposit of an adhesive strip 36 in splicing relation about the abutting film ends 32, 38. Next, both magnetic clutches 96 and 98 are operated to, in turn, result in simultaneous rotation of the sprockets 72 and 74.

Simultaneous rotation of the sprockets 72 and 74 results in the clearing of the spliced together film strips 30 and 26 from the guide 12. This clearing operation is conducted, however, only until the trailing end 38 of film strip 30 is moved into splicing position at the splicing stations 16. During this movement, film end 38 is, of course, disengaged from the sprocket 72, this disengagement, of course, not necessarily coinciding with the movement of the special retractable cog 100 into the starting position of the sprocket 72. Thus, sprocket 72 typically is required to be rotated after disengagement of the film strip 30 with it for an extent which positions the retractable cob 100 in the desired starting position. Meanwhile, sprocket 74 is rotated for a sufficient extent to result in the proper positioning of the film end 38 at the splicing station 16. In this connection, it will be recalled that the front and leading ends 32 and 38 of the film strip 30 have been trimmed by the cutters 36 and 68 so that the exact length of the film strip 30 is a known quantity which, in turn, requires positioning movement by a correspondingly known number of revolutions, driving operation of clutch 98 is terminated to, in turn, terminate rotation of the sprocket 74.

Apparatus 10 is completed by a takeup spool or reel 114 for the spliced together film strips. Reel 114 is intermittently operated by a takeup motor 116. During intervals of nonoperation, any slack in the spliced-together film strips is taken up by an appropriate takeup mechanism 118.

From the foregoing description it should be readily appreciated that the apparatus 10 is adapted, in a noteworthy manner, to achieve end-to-end splicing of film strips with a minimum of manual operations. Thus, apparatus 10 is advantageously operated in a darkened environment in which it would be difficult to perform any manual operation. Moreover, despite extensive handling of the film strips, there is no contact made with the emulsion on the body of the film strips and thus the possible adverse effect on the quality of pictures developed from the film strips is minimized despite the processing and handling of the film strips by the apparatus 10.

A latitude of modification, change and substitution is intended in the foregoing disclosure and in some instances some features of the invention will be employed without a corresponding use of other features.

What is claimed is:

1. A film strip handling and splicing apparatus comprising an elongated guide including a bottom wall and opposite sidewalls defining a film strip feed path, said sidewalls having notches in facing relation therein at locations above said bottom wall so that the opposite marginal sides of each processed film strip are accommodated in said notches while said film strip is held in a clearance position above said bottom wall, a film splicing station located along said feed path, independently operable first and second film-strip-feeding means respectively operatively arranged at opposite front and terminal ends of said feed path to urge successive film strips through feed movement in accordance with a prescribed movement sequence along said feed path, and control means for operating said film-strip-feeding means in accordance with said prescribed movement sequence such that a leading end of a first film strip is moved by said first film-strip-feeding means adjacent a trailing end of a second film strip then in position at said splicing station preparatory to the splicing of said film strips together and thereafter both said first and second film-strip-feeding means are simultaneously operated to clear said spliced film strips from said feed path until the trailing end of said first film strip is at said splicing station.

2. A film strip handling and splicing apparatus as defined in claim 1 wherein each said film-strip-feeding means is a sprocket journaled for rotation and having cogs circumferentially spaced about the periphery thereof adapted to extend into said notch of at least one said sidewall into engagement with said film strip, whereby said sprocket is effective to urge said engaged film strip through feed movement along said guide upon rotation thereof.

3. A film strip handling and splicing apparatus as defined in claim 1 including first and second cutting stations operatively arranged along said front end of said feed path effective to trim the leading and trailing ends of each said film strip preparatory to the positioning thereof at said splicing station.

4. A film strip handling and splicing apparatus as defined in claim 3 wherein said cutting station for trimming said trailing end of each said film strip includes cutting means and also control means for operating said cutting means in response to the length of said film strip.

* * * * *